United States Patent
Bergsma

(10) Patent No.: US 6,810,862 B2
(45) Date of Patent: Nov. 2, 2004

(54) FUEL TANK VAPOR RELIEF VALVE AND METHOD OF MAKING SAME

(75) Inventor: Rudolph Bergsma, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/401,081

(22) Filed: Mar. 27, 2003

(65) Prior Publication Data

US 2004/0187850 A1 Sep. 30, 2004

(51) Int. Cl.[7] .......................... F02M 25/08; F16K 24/00
(52) U.S. Cl. .................... 123/519; 137/15.19; 137/522; 29/890.124
(58) Field of Search ................................. 123/519, 520; 137/15.18, 522, 15.19; 251/83; 29/890.124

(56) References Cited

U.S. PATENT DOCUMENTS

| 5,388,611 A | * | 2/1995 | Harris | 123/519 |
| 5,794,661 A | | 8/1998 | Natalizia | 137/849 |
| 6,439,206 B1 | | 8/2002 | Shimamura et al. | 123/516 |

* cited by examiner

Primary Examiner—Andrew M. Dolinar
(74) Attorney, Agent, or Firm—Roger A. Johnston

(57) ABSTRACT

A diaphragm operated pressure responsive valve has its inlet connected to a fuel tank vapor line and the valving chamber openly connected to the storage canister and to the engine air intake manifold vapor purge control valve. The diaphragm is operable to vary the spring bias on a valve member disposed in the chamber for biasing closed the vapor line from the tank in the event of high vacuum from the engine purge control valves. A bleed bypass permits continued bleed flow of vapor from the tank to the valving chamber.

26 Claims, 2 Drawing Sheets

FUEL TANK VAPOR RELIEF VALVE AND METHOD OF MAKING SAME

BACKGROUND OF THE INVENTION

The present invention relates to the control of fuel vapor from a fuel tank to an engine air inlet and to a storage canister.

A known system for preventing the emission of fuel vapor to the atmosphere is shown in FIG. 2 where vapor from a fuel tank 1 flows through a conduit 2 to a conduit junction 3 which is connected to an electrically operated purge control valve 4 and also to a storage canister 5 which is connected through an electrically operated valve 6 to atmospheric. The valve 4 is electrically controlled by an engine computer 7 and has its outlet connected to the air intake manifold of the vehicle engine denoted by reference numeral 8.

In operation, upon engine start up and opening of the purge control valve 4, the known system of FIG. 2 draws vapor from both the fuel tank and the storage canister through junction 3 which effects a purging of the storage canister but can also result in a high vacuum being drawn in the fuel tank.

Furthermore the known system of FIG. 2 has the disadvantage that during periods of high air inlet depression or high vacuum the restricted flow from the canister may cause a high vacuum to be pulled in the fuel tank causing increased vaporization of fuel in the tank.

Thus, it has been desired to provide a way or means of controlling flow of fuel vapor from a tank which accommodates both the prevention of fuel emission to the atmosphere and provides for flow to the engine air intake manifold and prevents damage to the system components.

BRIEF SUMMARY OF THE INVENTION

The present invention provides a pressure differential responsive control valve disposed in the fuel vapor vent line of a vapor emission control system and prevents the engine air inlet induction from drawing a vacuum in the fuel tank yet permits a relatively high flow of fuel vapor to a storage canister when the purge valve is shut off.

The valve of the present invention provides a spring biased valve in the valving chamber inlet port from the tank vapor line; and, the chamber is in open communication with a first outlet to the engine air intake manifold through the purge valve and a second outlet to the storage canister. The spring bias on the valve is varied by a pressure responsive diaphragm which responds to the pressure differential between the pressure in the valving chamber and the atmospheric pressure. The valve of the present invention is spring biased to close the vent line from the tank in response to high engine induction vacuum thereby reducing the vapor flow from the fuel tank, yet maintains open communication between the canister and the engine inlet vapor purge valve. A bleed passage is provided to prevent vapor pressure build up in the fuel tank.

DETAILED DESCRIPTION OF THE INVENTION

Figure 1:
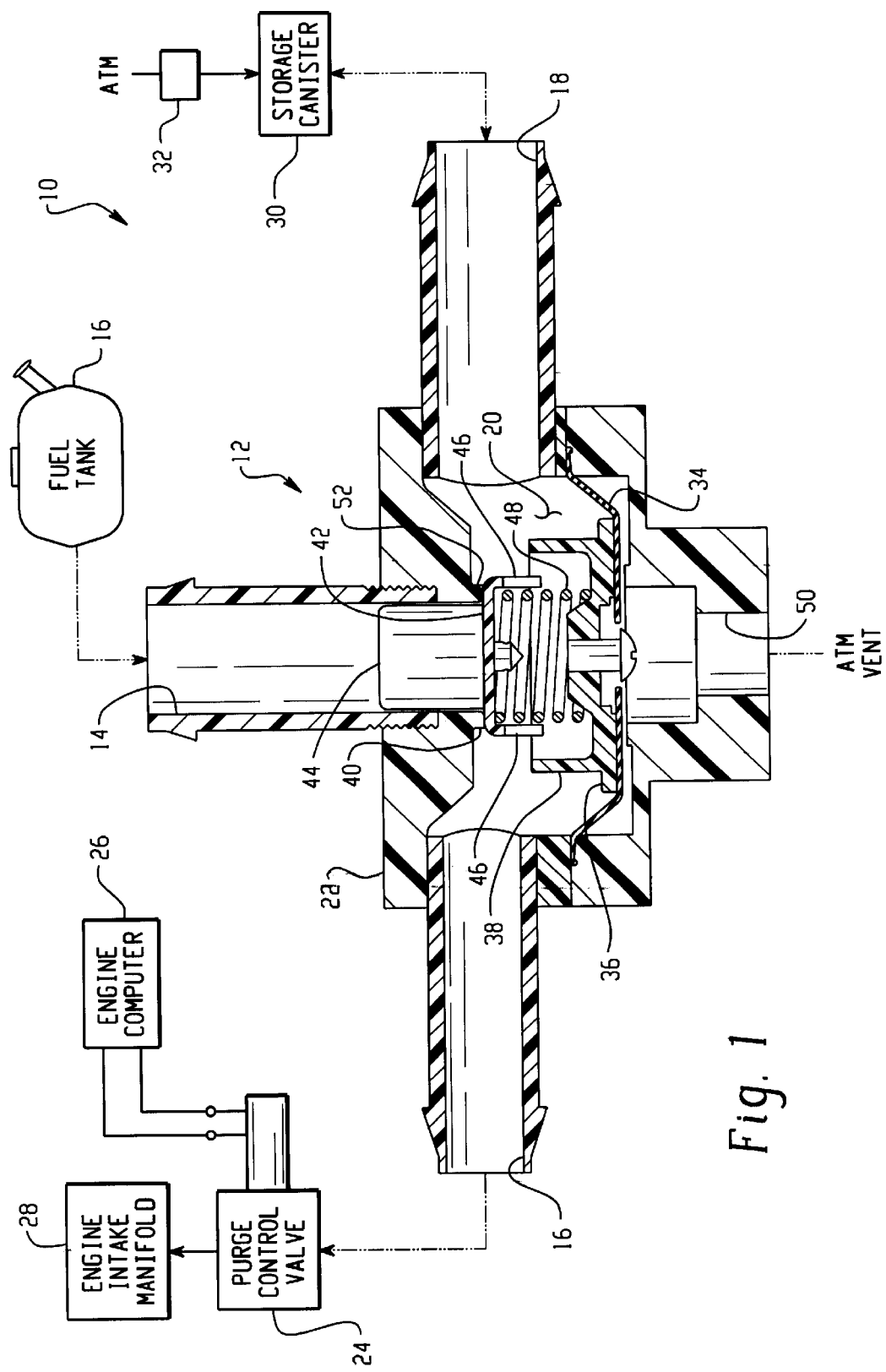
FIG. 1 is a schematic of a fuel vapor emission control system including a cross-section of the valve employed in the present invention; and, FIG. 2 is a schematic of a Prior Art fuel vapor emission control system.
Figure 2:
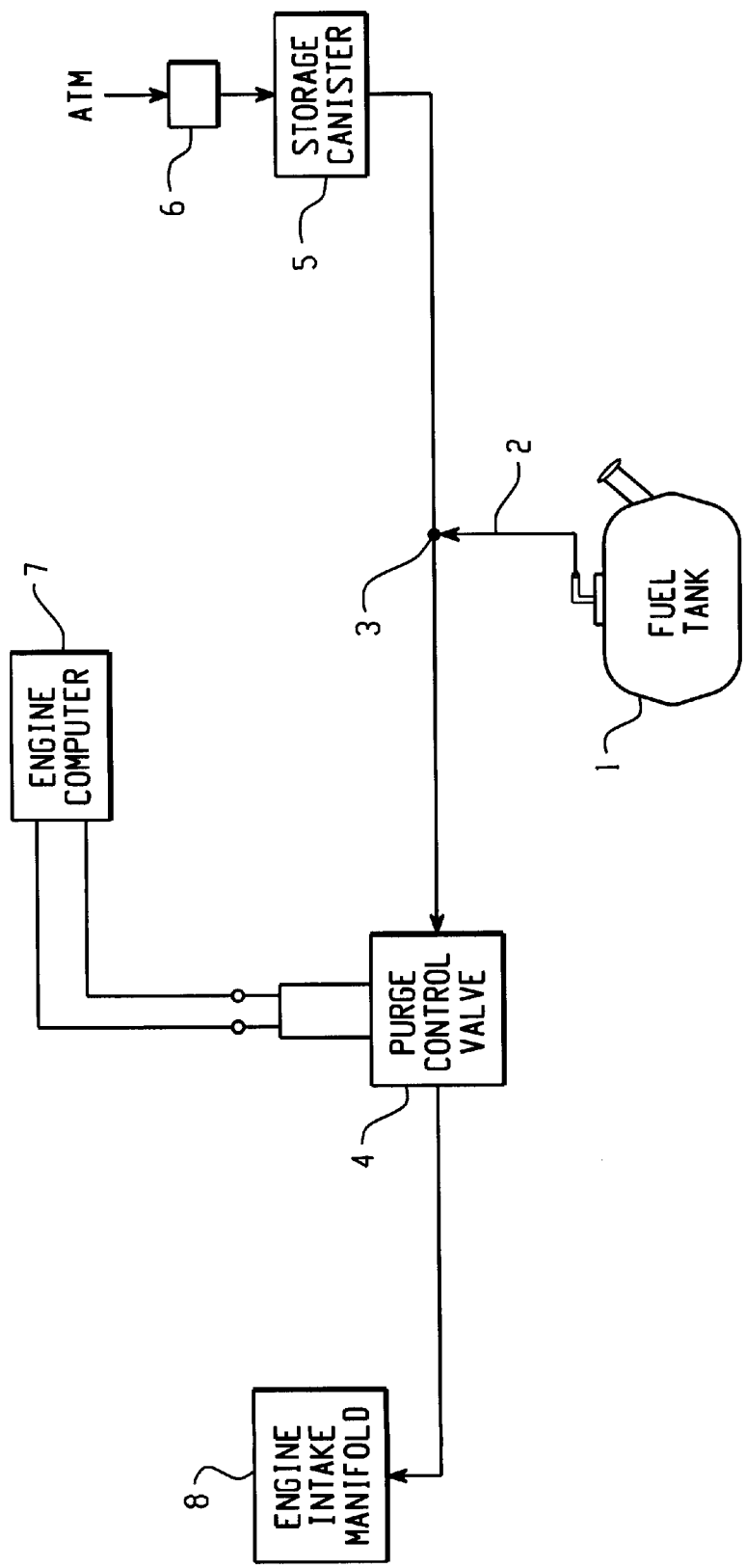

Referring to FIG. 1, a system for controlling fuel vapor emission is indicated generally at 10 and includes a pressure responsive vapor vent valve indicated generally at 12 which has a vapor inlet passage 14 connected to receive fuel vapor from a fuel tank 16. The valve 12 has a purge flow outlet passage 16 and a vapor storage outlet passage 18 both of which are in open communication with a valving chamber 20 formed within a valve body 22.

The purge outlet passage 16 is connected to an electrically operated purge control valve 24 which is controlled by an engine computer 26; and, valve 24 controls flow to the engine air intake manifold indicated by reference numeral 28.

The vapor storage outlet passage 18 is connected to a storage canister 30 which is operable to receive atmospheric purge air through a valve 32 when stored vapor is drawn from the canister 30. Valve 32 may include a filter for dirt and is used for on-board diagnostics (O.B.D.) and is normally open except when diagnostic testing is being performed.

The valving chamber 20 has a portion of the wall thereof formed by a pressure responsive member, preferably a flexible vapor impervious diaphragm 34 which includes a backing plate 36 with a travel limiting surface in the form of annulus 38.

Vapor inlet passage 14 has a valve seat 40 preferably forming the inlet port to chamber 40, with a valve member 42 registered thereagainst and having a pilot or guide 44 attached thereto and extending into the passage 14 for guiding movement thereof to assure alignment with respect to the valve seat 40. In the presently preferred practice, the valve member 42 has travel limit surfaces in the form of projections 46 extending therefrom in a direction away from the valve seat so as to limit movement of the valve member 42 in a direction away from the valve seat; and, the projections 46 make contact with the diaphragm backing plate 36 to limit travel of valve member 42.

A means for applying a bias force to the valve member in a direction toward the valve seat is embodied in the form of coil spring 48 which has the upper end thereof registered against valve member 46 and the lower end thereof registered against the backing plate 36. It will be understood that in this arrangement movement of the diaphragm 34 and backing plate 36 effects changes in the length of the spring 48 and thus varies the bias force on the valve member 42.

In the present practice of the invention annulus 38 makes contact with the upper chamber wall surrounding valve seat 40 before spring 48 becomes "stacked up" or all space between coils is closed. This is the condition or state the valve seeks during normal operation. The valve 46 is biased against seat 40 to cause a controlled position pressure difference in the tank with respect to chamber 20 to increase vapor flow to chamber 20.

The side of the diaphragm opposite the backing plate 36, or the lower surface of the diaphragm in FIG. 1, is vented to the atmosphere through the port 50 such that the diaphragm is responsive to the changes in the pressure within the chamber 20.

A bleed passage is provided to permit a small or limited flow of vapor from the passage 14 into the valving chamber 20 and outwardly of passages 16, 18 when the valve member 42 is seated against valve seat 40. In the presently preferred practice, the bleed passage comprises a notch 52 formed in the valve seat 40. It will be understood however, that the bleed passage may be formed otherwise in the valve body 22 between passage 14 and chamber 20.

In operation, the area of a diaphragm 34 and the spring rate of spring 48 are chosen so as to provide sufficient force to hold the valve member 42 in contact with the valve seat 40 when the pressure differential across the diaphragm is greater than two (2) inches $H_2O$ (50.8 mm $H_2O$) such that during engine operation a vacuum in the engine air inlet will draw vapor from the storage canister and through the bleed passage 52 and thus prevent a vacuum from being drawn in the vehicle fuel tank 16.

In the event of elevated ambient temperatures causing an increase of the positive pressure of vapor within the fuel tank, the increased vapor pressure will lift the valve member 46 and permit vapor flow to the canister and to the engine if it is running at the time.

The present invention thus provides the pressure responsive control valve for controlling flow of fuel tank vapor to an engine air intake manifold inlet and to a storage canister during conditions of engine running and engine shutdown and does so in a manner which increases the purge rate of the canister and reduces the surging of vapor from the tank to the engine.

Although the invention has hereinabove been described with respect to the illustrated embodiments, it will be understood that the invention is capable of modification and variation and is limited only by the following claims.

What is claimed is:

1. A fuel tank vapor relief valve comprising:
   (a) valve body structure defining a valving chamber having a vapor inlet port defining a valve seat adapted for connection to a fuel tank and a canister outlet port and a purge outlet port with each of the latter in open communication with said chamber;
   (b) a pressure responsive member having one side thereof forming a portion of the wall of said valving chamber with a side of said member opposite said one side vented to atmosphere wherein said member is moveable in response to pressure changes in said chamber;
   (c) a valve member disposed in said chamber and moveable between a first position seated on said valve seat and a second position unseated from said valve seat; and,
   (d) means applying a bias force to said valve member toward said first position wherein said pressure responsive member is operable to vary said bias force in response to movement thereof.

2. The control valve defined in claim 1, wherein said means applying a bias force includes a spring having one end contacting said pressure responsive member and an opposite end contacting said valve member.

3. The control valve defined in claim 1, wherein said pressure responsive member includes a flexible diaphragm of low permeability material.

4. The control valve defined in claim 1, wherein said valve body structure includes a bleed passage notch formed in said valve seat.

5. The control valve defined in claim 1, wherein said pressure responsive member comprises a flexible diaphragm including polyethylene teraphthalate (PET) material.

6. The control valve defined in claim 1, wherein said valve member includes a portion thereof slidably received in said inlet port and guided therein for said movement between said first and second position.

7. The control valve defined in claim 1, wherein said body includes a plurality of tubular members extending outwardly therefrom with each forming respectively one of said vapor inlet, canister outlet and purge outlet ports.

8. The control valve defined in claim 1, wherein said pressure responsive member comprises a flexible diaphragm including fluoropolymer material.

9. The control valve defined in claim 1, wherein said pressure responsive member comprises a flexible diaphragm having one side thereof metallized for vapor impermeability.

10. The control valve defined in claim 1, wherein said pressure responsive member is formed of material selected from the group consisting essentially of polytetrafluoroethylene (PTFE), ethylene tetrafluoroethylene (ETFE), fluorinated ethylene propylene (FEP) and polyethylene teraphthalate (PET).

11. A method of making a fuel vapor purge control valve comprising:
   (a) providing a valve body and forming a valving chamber therein communicating through a valve seat with a vapor inlet port and communicating openly with a purge outlet and a canister outlet;
   (b) forming a portion of the wall of the valving chamber with a pressure responsive member with a surface of relatively low vapor permeability and venting to atmosphere the side of the pressure responsive member opposite said chamber;
   (c) disposing a valve member in the chamber and biasing the valve member toward a closed position with respect to the valve seat;
   (d) varying said biasing in response to pressure changes in said chamber; and,
   (e) forming a bleed passage and bypassing the valve seat and maintaining a limited bleed flow between the inlet and the valving chamber when the valve member is in the closed position.

12. The method defined in claim 11, wherein said step of forming a portion of the wall with a pressure responsive member includes forming a pressure responsive member including polymeric material.

13. The method defined in claim 11, wherein said step of forming a pressure responsive member includes forming a member of polymeric material having a metallized surface.

14. The method defined in claim 11, wherein said step of disposing a valve member includes disposing a member formed of elastomeric material.

15. The method defined in claim 11, wherein said step of bleed passage includes forming a notch in the valve seat.

16. The method defined in claim 11, wherein said step of disposing a valve member includes biasing the valve member to the open position.

17. The method defined in claim 11, wherein said step of disposing a valve member includes slidably guiding said valve member on said valve body and maintaining said valve member aligned with the valve seat.

18. The method defined in claim 11, wherein said step of forming a wall portion with a pressure responsive member includes disposing a flexible diaphragm and forming the diaphragm of material selected from the group consisting essentially of ethylene tetrafluoroethylene (ETFE), polytetrafluoroethylene (PTFE), fluorinated ethylene propylene (FEP) and polyethylene teraphthalate (PET).

19. The method defined in claim 11, wherein said step of forming a wall portion with a pressure responsive member includes forming a flexible diaphragm of polymeric material and metallizing one side of the diaphragm.

20. The method defined in claim 19, wherein said step of metallizing includes coating the said one side with a film of material consisting essentially of aluminum.

21. A method of controlling flow of fuel vapor from a fuel tank to a storage canister and to an engine air inlet comprising:

(a) providing a valve body with a valving chamber having a first and second open port therein and a third port with a valve seat;

(b) disposing a moveable valve member in said chamber and biasing the member toward contact with the valve;

(c) forming a portion of the wall of said chamber with a pressure responsive member and varying the biasing with movement of said pressure responsive member; and, (d) connecting said first port to an engine purge valve, said second port to a storage device and said third port to a fuel tank vapor vent.

22. The method defined in claim 21, wherein said step of biasing said valve member includes disposing a spring between said valve member and said pressure responsive member.

23. The method defined in claim 21, wherein said step of forming a portion of the wall of said chamber includes disposing a flexible diaphragm.

24. The method defined in claim 21, wherein said step of forming a portion of the wall of said chamber with a pressure responsive member includes venting to the atmosphere the side of said pressure responsive member outside said chamber.

25. The method defined in claim 21, wherein said step of providing a valve body includes forming a bleed channel bypassing said valve seat.

26. The method defined in claim 25, wherein said step of forming a bleed channel includes forming a notch in said valve seat.

* * * * *

UNITED STATES PATENT AND TRADEMARK OFFICE
CERTIFICATE OF CORRECTION

PATENT NO. : 6,810,862 B2
DATED : November 2, 2004
INVENTOR(S) : Rudolph Bergsma Page 1 of 1

It is certified that error appears in the above-identified patent and that said Letters Patent is hereby corrected as shown below:

Column 5,
Line 26, "with the valve" should read -- with the valve seat --

Signed and Sealed this

First Day of March, 2005

JON W. DUDAS
*Director of the United States Patent and Trademark Office*